(12) United States Patent
Lee et al.

(10) Patent No.: US 9,993,953 B2
(45) Date of Patent: Jun. 12, 2018

(54) ACTUATOR APPARATUS AND METHOD ENABLING MULTIPLE PISTON VELOCITIES

(71) Applicant: Synventive Molding Solutions, Inc., Peabody, MA (US)

(72) Inventors: Christopher Lee, Beverly, MA (US); Vito Galati, Rowley, MA (US)

(73) Assignee: Syneventive Molding Solutions, Inc., Peabody, MA (US)

( * ) Notice: Subject to any disclaimer, the term of this patent is extended or adjusted under 35 U.S.C. 154(b) by 49 days.

(21) Appl. No.: 15/404,923

(22) Filed: Jan. 12, 2017

(65) Prior Publication Data
US 2017/0120493 A1    May 4, 2017

Related U.S. Application Data

(63) Continuation of application No. PCT/US2015/044429, filed on Aug. 10, 2015, and a
(Continued)

(51) Int. Cl.
*B29C 45/28* (2006.01)
*B29C 45/76* (2006.01)
(Continued)

(52) U.S. Cl.
CPC ........... *B29C 45/281* (2013.01); *B29C 45/76* (2013.01); *B29C 45/7613* (2013.01);
(Continued)

(58) Field of Classification Search
CPC .......... B29C 45/281; B29C 2045/2865; B29C 2045/2872
See application file for complete search history.

(56) References Cited

U.S. PATENT DOCUMENTS 6,035,634 A    3/2000 Tupper et al.
6,386,508 B1   5/2002 Steil et al.
(Continued)

FOREIGN PATENT DOCUMENTS

EP    0269091 A2    1/1988
EP    2360003 A1    8/2011
(Continued)

OTHER PUBLICATIONS

Int'l. Search Report and Written Opinion dated Nov. 18, 2015 in corresponding Int'l. Appln. No. PCT/US2015/044429.

*Primary Examiner* — James Sanders
(74) *Attorney, Agent, or Firm* — Polsinelli; M. Lawrence Oliverio; Therese A. Hendricks

(57) ABSTRACT

An injection molding apparatus comprising a manifold, an actuator having a piston that divides an enclosed actuator housing into upstream and downstream actuator drive chambers, the piston having an internal piston chamber and a piston bore that communicates flow of the drive fluid between one of the upstream or downstream actuator drive chambers and the internal piston chamber, a flow rate controller adapted to enable flow of drive fluid between one of the upstream or downstream actuator drive chambers and a source of drive fluid at a first low rate of flow over a selected first portion of the stroke length of the piston and at a second high rate of flow over a selected second portion of the stroke length of the piston.

25 Claims, 9 Drawing Sheets

Related U.S. Application Data continuation-in-part of application No. 14/567,369, filed on Dec. 11, 2014, now Pat. No. 9,636,858, and a continuation-in-part of application No. 14/567,308, filed on Dec. 11, 2014, now Pat. No. 9,623,598, and a continuation-in-part of application No. 14/930,692, filed on Nov. 3, 2015, now Pat. No. 9,908,273.

(51) Int. Cl.
    *F15B 15/14*     (2006.01)
    *F15B 15/20*     (2006.01)
    *B29C 45/17*     (2006.01)
    *B29C 45/27*     (2006.01)

(52) U.S. Cl.
CPC ........ *F15B 15/149* (2013.01); *F15B 15/1447* (2013.01); *F15B 15/1466* (2013.01); *F15B 15/204* (2013.01); *B29C 2045/1792* (2013.01); *B29C 2045/2712* (2013.01); *B29C 2045/2865* (2013.01); *B29C 2045/2872* (2013.01); *B29C 2945/76006* (2013.01); *B29C 2945/7628* (2013.01); *B29C 2945/76076* (2013.01); *B29C 2945/76083* (2013.01); *B29C 2945/76277* (2013.01); *B29C 2945/76381* (2013.01); *B29C 2945/76545* (2013.01); *B29C 2945/76598* (2013.01); *B29C 2945/76692* (2013.01); *B29C 2945/76755* (2013.01); *B29C 2945/76859* (2013.01); *B29C 2945/76933* (2013.01)

(56) References Cited

U.S. PATENT DOCUMENTS

| | | |
|---|---|---|
| 2004/0056225 A1 | 3/2004 | Novo et al. |
| 2010/0225025 A1 | 9/2010 | Striegel |

FOREIGN PATENT DOCUMENTS

| | | |
|---|---|---|
| WO | 2012074879 A1 | 6/2012 |
| WO | 2014120629 A1 | 8/2014 |
| WO | 2014193829 A1 | 12/2014 |

US 9,993,953 B2

ACTUATOR APPARATUS AND METHOD ENABLING MULTIPLE PISTON VELOCITIES

RELATED APPLICATIONS

This application is a continuation of and claims the benefit of priority to PCT/US2015/044429 filed Aug. 10, 2015, the disclosure of which is incorporated by reference as if set forth in its entirety herein.

This application is a continuation-in-part of and claims the benefit of priority to U.S. application Ser. No. 14/567,369 filed Dec. 11, 2014, the disclosure of which is incorporated by reference in its entirety as if fully set forth herein.

This application is also a continuation-in-part of and claims the benefit of priority to U.S. application Ser. No. 14/567,308 filed Dec. 11, 2014 the disclosure of which is incorporated by reference in its entirety as if fully set forth herein.

This application is also a continuation-in-part of U.S. application Ser. No. 14/930,692 filed Nov. 3, 2015, the disclosure of which is incorporated by reference in its entirety as if fully set forth herein.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300, U.S. Pat. No. 6,419,870, U.S. Pat. No. 6,464,909, U.S. Pat. No. 6,599,116, U.S. Pat. No. 7,234,929, U.S. Pat. No. 7,419,625, U.S. Pat. No. 7,569,169, U.S. patent application Ser. No. 10/214,118, filed Aug. 8, 2002, U.S. Pat. No. 7,029,268, U.S. Pat. No. 7,270,537, U.S. Pat. No. 7,597,828, U.S. patent application Ser. No. 09/699,856 filed Oct. 30, 2000, U.S. patent application Ser. No. 10/269,927 filed Oct. 11, 2002, U.S. application Ser. No. 09/503,832 filed Feb. 15, 2000, U.S. application Ser. No. 09/656,846 filed Sep. 7, 2000, U.S. application Ser. No. 10/006,504 filed Dec. 3, 2001, and U.S. application Ser. No. 10/101,278 filed Mar. 19, 2002 and PCT Application No. PCT/US11/062099 and PCT Application No. PCT/US11/062096.

BACKGROUND OF THE INVENTION

Injection molding systems such as disclosed in PCT Application No. PCT/US11/062099 and PCT Application No. PCT/US11/062096 have been developed employing controls that regulate the velocity of an actuator drive at multiple selectable speeds at selectable times and over selectable lengths of valve pin travel.

SUMMARY OF THE INVENTION

In accordance with the invention there is provided an injection molding apparatus 10 comprising:

a manifold 50 that receives an injection fluid material 22 from an injection molding machine 20, the manifold 50 routing the injection fluid to a fluid delivery channel 32 having a flow path 62 that extends and delivers the injection fluid material under an injection pressure to a gate 54 of a mold cavity 52, an actuator 80 comprising a fluid sealed housing 82 having a piston 90 interconnected to a valve pin 40, the piston 90 being slidably mounted within the housing 82 for travel over a selected stroke length SL between an upstream fully gate open position and a downstream gate closed position, wherein the piston 90 divides the enclosed actuator housing into upstream 84 and downstream 86 actuator drive chambers that are each interconnected to a source 70 of drive fluid 72 by respective upstream 83 and downstream 85 fluid source communication channels, a tube 102 adapted to cooperate with the piston 90 to route 104 flow of drive fluid 72 between the one of the upstream 84 or downstream 86 actuator drive chambers and the source 70 of drive fluid at a first low rate of flow over a selected first portion P1 of the stroke length SL of the piston 90 and at a second high rate of flow over a selected second portion P2 of the stroke length of the piston.

The tube 102 forms an inner drive fluid channel 104, 104a that connects one of the upstream 83 or downstream 85 fluid source communication channels to a respective one of the upstream 84 and downstream 86 actuator drive chambers, the tube 102 having an outer wall 105 that is slidably receivable within a complementary aperture 95, 96 disposed within the piston 90 to form a restriction gap G that enables flow of the drive fluid from the upstream 84 or downstream 86 actuator drive chamber to a respective one of the upstream 83 or downstream 85 fluid source communication channels at the first low rate of flow over the selected portion P1 of the stroke length.

Such an apparatus can further comprise a check valve 110 adapted to enable unrestricted flow of the drive fluid when driven from one of the upstream 83 and downstream 85 fluid source communication channels into a respective one of the upstream 84 or downstream 86 actuator drive chambers over the entire stroke length SL separately from the tube 102.

In another aspect of the invention there is provided a method of mechanically driving a valve pin in an injection molding apparatus at a first low velocity and at a second higher velocity comprising interconnecting the valve pin to the piston of the apparatus 10 and operating the apparatus 10 to drive the piston upstream or downstream through the selected stroke length.

In another aspect of the invention there is provided an injection molding apparatus 10 comprising:

a manifold 50 that receives an injection fluid material 22 from an injection molding machine 20, the manifold 50 routing the injection fluid to a fluid delivery channel 32 having a flow path 62 that extends and delivers the injection fluid material under an injection pressure to a gate 54 of a mold cavity 52, an actuator 80 comprising a fluid sealed housing 82 having a piston 90 interconnected to a valve pin 40, the piston 90 being slidably mounted within the housing 82 for travel over a selected stroke length SL between an upstream fully gate open position and a downstream gate closed position, wherein the piston 90 divides the enclosed actuator housing into upstream 84 and downstream 86 actuator drive chambers that are each interconnected to a source 70 of drive fluid 72 by respective upstream 83 and downstream 85 fluid source communication channels, the piston 90 having an internal piston chamber 92 and a piston bore 94 that communicates flow of the drive fluid 72 between one of the upstream 84 or downstream 86 actuator drive chambers and the internal piston chamber 92, the actuator 80 including a drive fluid controller 100 comprised of a drive fluid channel 104 that communicates flow of the drive fluid between the enclosed piston chamber 92 and the source 70 of drive fluid, the drive fluid controller 100 being adapted to enable flow of drive fluid 72 between one of the upstream 84 or downstream 86 actuator drive chambers and the source 70 of drive fluid at a first low rate of flow over a selected first portion P1 of the stroke length SL of the piston and at a second high rate of flow over a selected second portion P2 of the stroke length of the piston.

In such an apparatus the drive fluid controller is preferably adapted to enable flow of drive fluid between the piston chamber and the upstream actuator drive chamber.

The drive fluid controller can be adapted to enable the first low rate of flow to occur over a selected portion of the stroke length that extends from the downstream gate closed position upstream to a selected intermediate upstream position.

The drive fluid controller can be adapted to enable the high rate of flow to occur over a selected portion of the stroke length extending from the selected intermediate upstream position to the upstream fully gate open position.

The drive fluid controller preferably includes a restrictor that restricts flow of the drive fluid from the one upstream or downstream actuator drive chamber to the piston chamber when the piston is disposed within the selected first portion of the stroke length, the restrictor being displaced when the piston is disposed within the selected second portion of the stroke length.

The drive fluid controller can comprise a control tube having a control tube flow bore communicating fluid flow between the source of drive fluid and the piston chamber, a distal portion of the control tube having an outer circumferential surface slidably received within a complementary receiving aperture of the piston chamber forming a restriction gap that restricts flow of drive fluid between the piston chamber and the control tube flow bore to the first low rate of flow when the piston is disposed within the selected first portion of the stroke length.

The control tube and the piston bore are preferably adapted to enable unrestricted flow of drive fluid between the piston chamber and the upstream actuator drive chamber when the piston is disposed within the selected second portion of the stroke length.

The restriction gap and the control tube flow bore are typically adapted to enable the drive fluid to flow at the first low rate of flow over a selected portion of the stroke length that extends from the downstream gate closed position upstream to a selected intermediate upstream position.

The restriction gap and the control tube flow bore are typically adapted to enable the drive fluid to flow at the high rate of flow over a selected portion of the stroke length extending from the intermediate upstream position to the upstream fully gate open position.

The control tube flow bore can be obstructed from free fluid flow communication with the one actuator drive chamber when the piston is disposed within the selected first portion of the stroke length and wherein the tube flow bore is in free fluid flow communication with the piston chamber when the piston is disposed within the selected second portion of the stroke length.

Such an apparatus can further comprise a check valve having a valve flow channel having a first port communicating with one or the other of the upstream and downstream fluid source communication channels and a second port communicating with a respective one of the upstream or downstream actuator drive chambers separately from the drive fluid controller, the check valve being adapted to prevent flow through the second port when drive fluid is exiting or driven out of the respective one of the upstream or downstream actuator drive chambers with which the second port communicates and to enable flow through the second port when drive fluid is entering or driven into the respective one of the upstream or downstream actuator drive chambers with which the second port communicates.

The check valve can include a plunger and a spring urging the plunger into a position closing the valve flow channel under a preselected force.

Such an apparatus can further comprise a check valve having a valve flow channel having a first port communicating with the upstream fluid source communication channel and a second port communicating with the upstream actuator drive chamber separately from the drive flow controller, the check valve being adapted to prevent flow through the second port when the piston is driven upstream.

An apparatus can further comprise a check valve adapted to enable unrestricted flow of the drive fluid when driven from one of the upstream and downstream fluid source communication channels into a respective one of the upstream or downstream actuator drive chambers over the entire stroke length separately from the drive fluid controller.

In another aspect of the invention there is provided a method of mechanically driving a valve pin in an injection molding apparatus at a first low velocity and at a second higher velocity comprising interconnecting the valve pin to the piston of the apparatus described immediately above and operating the apparatus to drive the piston upstream or downstream through the selected stroke length.

In another aspect of the invention there is provided a method of mechanically driving a valve pin in an injection molding apparatus at a first low velocity and at a second higher velocity wherein the injection molding apparatus comprises:

a manifold that receives an injection fluid material from an injection molding machine, the manifold routing the injection fluid to a fluid delivery channel having a flow path that extends and delivers the injection fluid material under an injection pressure to a gate of a mold cavity, an actuator comprising a fluid sealed housing having a piston interconnected to a valve pin, the piston being slidably mounted within the housing for travel over a selected stroke length between an upstream fully gate open position and a downstream gate closed position, wherein the piston divides the enclosed actuator housing into upstream and downstream actuator drive chambers that are each interconnected to a source of drive fluid by respective upstream and downstream fluid source communication channels, the piston having an internal piston chamber and a piston bore that communicates flow of the drive fluid between one of the upstream or downstream actuator drive chambers and the internal piston chamber, the actuator including a drive fluid controller comprised of a drive fluid channel that communicates flow of the drive fluid between the enclosed piston chamber and the source of drive fluid, the drive fluid controller being adapted to enable flow of drive fluid between one of the upstream or downstream actuator drive chambers and the source of drive fluid at a first low rate of flow over a selected first portion of the stroke length of the piston and at a second high rate of flow over a selected second portion of the stroke length of the piston, the method comprising:

feeding the drive fluid into the one of the upstream or downstream actuator drive chambers at an elevated pressure sufficient to drive the piston along the stroke length.

In such a method the piston bore preferably communicates flow of the drive fluid between the upstream actuator drive chamber and the internal piston chamber, the drive fluid controller is adapted to enable flow of drive fluid between the upstream actuator drive chamber and the source of drive fluid, and the apparatus includes a check valve having a valve flow channel having a first port communicating with the upstream fluid source communication channel and a second port communicating with the upstream actuator drive chamber separately from the drive fluid controller, the check valve being adapted to prevent flow through the second port when the piston is driven upstream, and the method preferably further comprises:

driving the piston downstream by feeding the drive fluid into the upstream actuator drive chamber at an elevated pressure sufficient to drive the piston along the stroke length.

In another aspect of the invention there is provided an injection molding apparatus comprising:

a manifold that receives an injection fluid material from an injection molding machine, the manifold routing the injection fluid to a fluid delivery channel having a flow path that extends and delivers the injection fluid material under an injection pressure to a gate of a mold cavity, an actuator comprising a fluid sealed housing having a piston interconnected to a valve pin, the piston being slidably mounted within the housing for travel over a selected stroke length between an upstream fully gate open position and a downstream gate closed position, wherein the piston divides the enclosed actuator housing into upstream and downstream actuator drive chambers that are each interconnected to a source of drive fluid by respective upstream and downstream fluid source communication channels, a tube having a drive fluid channel that communicates flow of the drive fluid between an enclosed piston chamber and the source of drive fluid, the piston including a piston bore that communicates flow of fluid between the one of the upstream or downstream actuator drive chambers and the enclosed piston chamber, the tube being adapted to enable flow of drive fluid between the one of the upstream or downstream actuator drive chambers and the source of drive fluid at a first low rate of flow over a selected first portion of the stroke length of the piston and at a second high rate of flow over a selected second portion of the stroke length of the piston.

Such an apparatus preferably further comprises a check valve having a valve flow channel having a first port communicating with one or the other of the upstream and downstream fluid source communication channels and a second port communicating with a respective one of the upstream or downstream actuator drive chambers separately from the drive fluid controller, the check valve being adapted to prevent flow through the second port when drive fluid is exiting or driven into the respective one of the upstream or downstream actuator drive chambers with which the second port communicates and to enable flow through the second port when drive fluid is entering or driven into the respective one of the upstream or downstream actuator drive chambers with which the second port communicates.

In another aspect of the invention there is provided a method of mechanically driving a valve pin in an injection molding apparatus at a first low velocity and at a second higher velocity comprising interconnecting the valve pin to the piston of the apparatus described immediately above and operating the apparatus to drive the piston upstream or downstream through the selected stroke length.

In another aspect of the invention there is provided a method of mechanically driving a valve pin in an injection molding apparatus at a first low velocity and at a second higher velocity wherein the injection molding apparatus comprises:

a manifold that receives an injection fluid material from an injection molding machine, the manifold routing the injection fluid to a fluid delivery channel having a flow path that extends and delivers the injection fluid material under an injection pressure to a gate of a mold cavity, an actuator comprising a fluid sealed housing having a piston interconnected to a valve pin, the piston being slidably mounted within the housing for travel over a selected stroke length between an upstream fully gate open position and a downstream gate closed position, wherein the piston divides the enclosed actuator housing into upstream and downstream actuator drive chambers that are each interconnected to a source of drive fluid by respective upstream and downstream fluid source communication channels, a tube having a drive fluid channel that communicates flow of the drive fluid between an enclosed piston chamber and the source of drive fluid, the piston including a piston bore that communicates flow of fluid between the one of the upstream or downstream actuator drive chambers and the enclosed piston chamber, the tube being adapted to enable flow of drive fluid between the one of the upstream or downstream actuator drive chambers and the source of drive fluid at a first low rate of flow over a selected first portion of the stroke length of the piston and at a second high rate of flow over a selected second portion of the stroke length of the piston, the method comprising:

feeding the drive fluid into the one of the upstream or downstream actuator drive chambers at an elevated pressure sufficient to drive the piston along the selected stroke length.

In another aspect of the invention there is provided a method of mechanically driving a valve pin in an injection molding apparatus as described immediately above at a first low velocity and at a second higher velocity comprising interconnecting the valve pin to the piston of the apparatus and operating the apparatus to drive the piston upstream or downstream through the selected stroke length.

In another aspect of the invention there is provided an injection molding apparatus 10 comprising:

a manifold 50 that receives an injection fluid material 22 from an injection molding machine 20, the manifold 50 routing the injection fluid to a fluid delivery channel 32 having a flow path 62 that extends and delivers the injection fluid material under an injection pressure to a gate 54 of a mold cavity 52, an actuator 80 comprising a fluid sealed housing 82 having a piston 90 interconnected to a valve pin 40, the piston 90 being slidably mounted within the housing 82 for travel over a selected stroke length SL between an upstream fully gate open position and a downstream gate closed position, wherein the piston 90 divides the enclosed actuator housing into upstream 84 and downstream 86 actuator drive chambers that are each interconnected to a source 70 of drive fluid 72 by respective upstream 83 and downstream 85 fluid source communication channels, the actuator including one or more internal channels 94, 104, G, that communicate drive fluid between one or the other of the upstream 84 and downstream 86 actuator drive chambers, the one or more internal channels being adapted to communicate drive fluid between the upstream 84 or downstream 86 drive chamber and the source of fluid such that the piston is driven at a first low velocity of travel P1v over the course of travel of a first portion P1 of the stroke length SL and such that the piston is driven at a second high velocity of travel P2v over the course of travel of a second portion P2 of the stroke length SL.

A method of mechanically driving a valve pin in an injection molding apparatus at a first low velocity and at a second higher velocity comprising interconnecting the valve pin to the piston of the apparatus described immediately above and operating the apparatus to drive the piston upstream or downstream through the selected stroke length.

BRIEF DESCRIPTION OF THE DRAWINGS

The above and further advantages of the invention may be better understood by referring to the following description in conjunction with the accompanying drawings in which.

DETAILED DESCRIPTION

Figure 1:
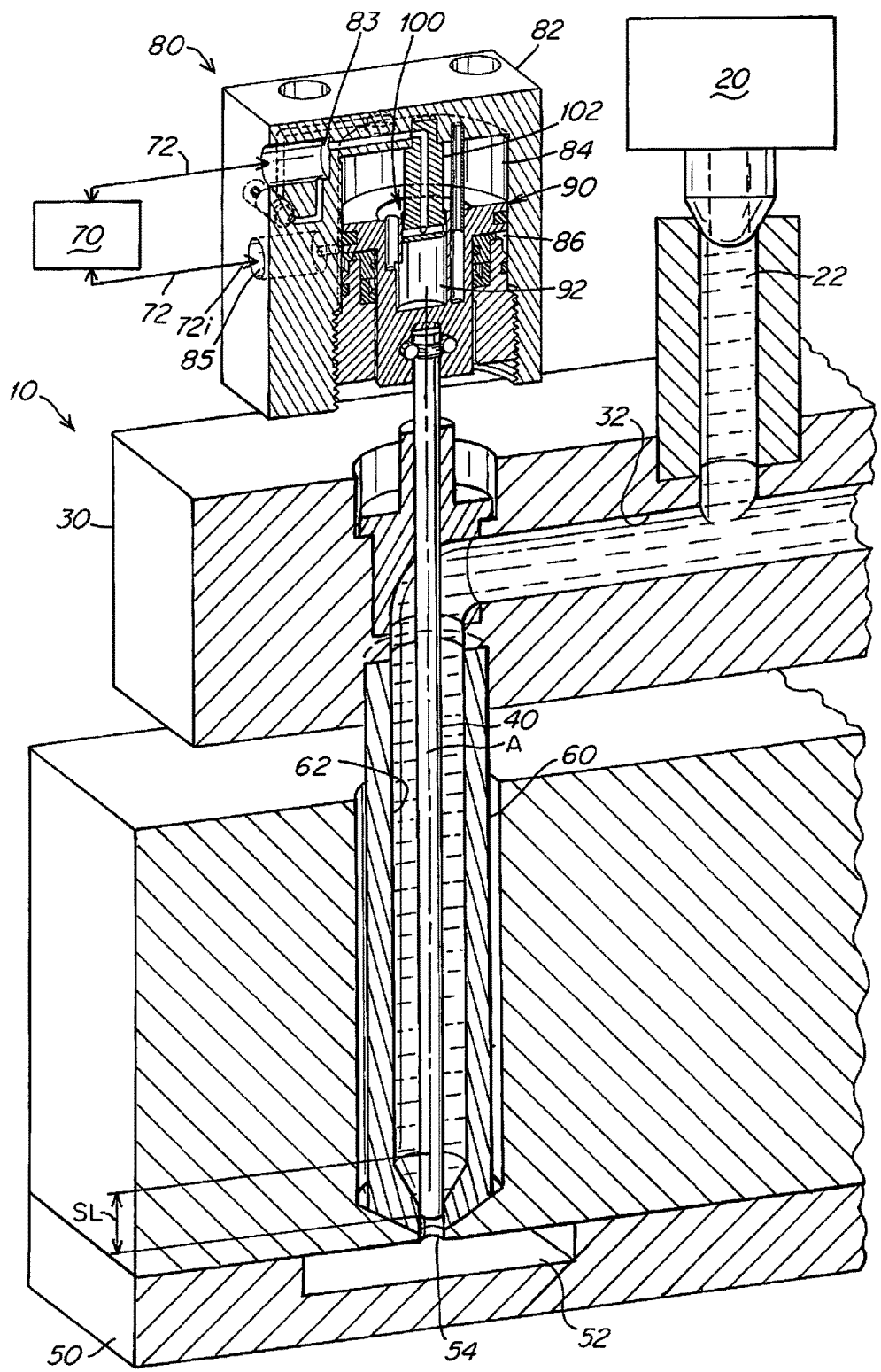
FIG. 1 is a right side perspective sectional view of an actuator component of an apparatus according to the invention showing a fluid feed port communicating with a downstream actuator drive chamber.
Figure 2:
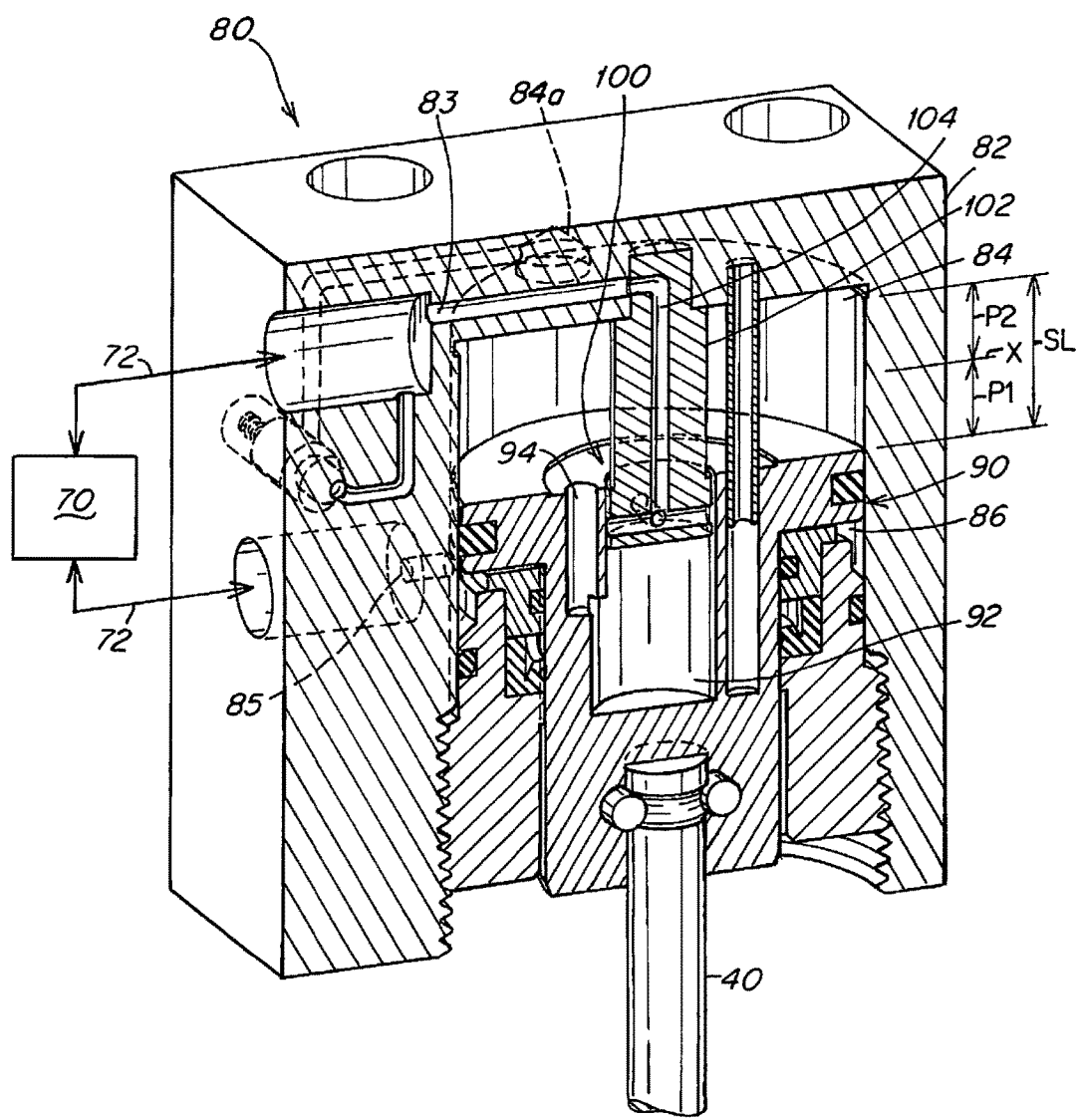
FIG. 2 is a right side perspective sectional view of the FIG. 1 system showing the arrangement of a control fluid delivery tube relative to an internal piston chamber and a piston bore enabling fluid communication between the upstream and downstream drive chambers of the actuator.
Figure 3:
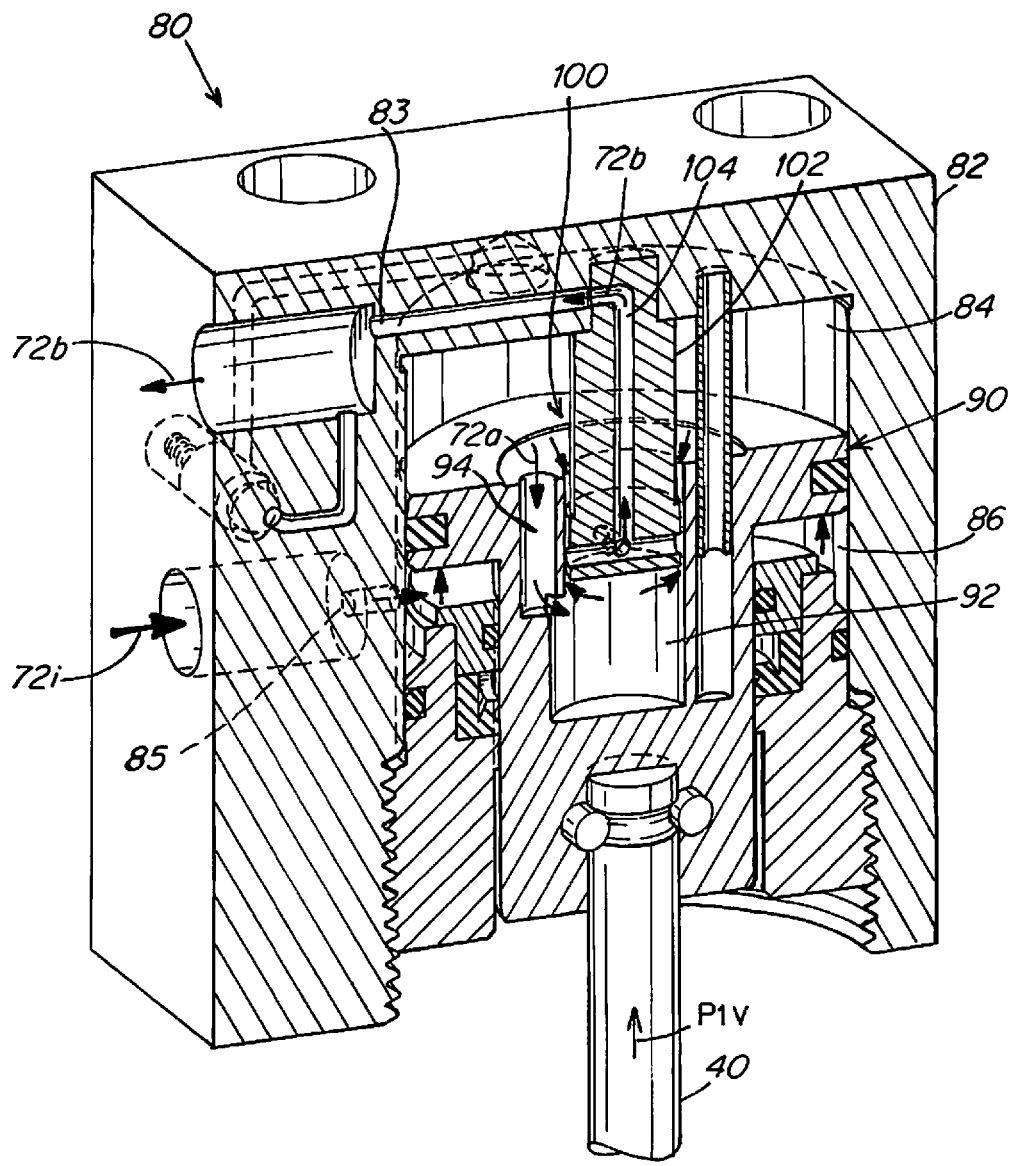
FIG. 3 is a view similar to FIG. 2 showing the initial path of flow of drive fluid at the beginning of an upstream drive cycle of the piston of the actuator.
Figure 4:
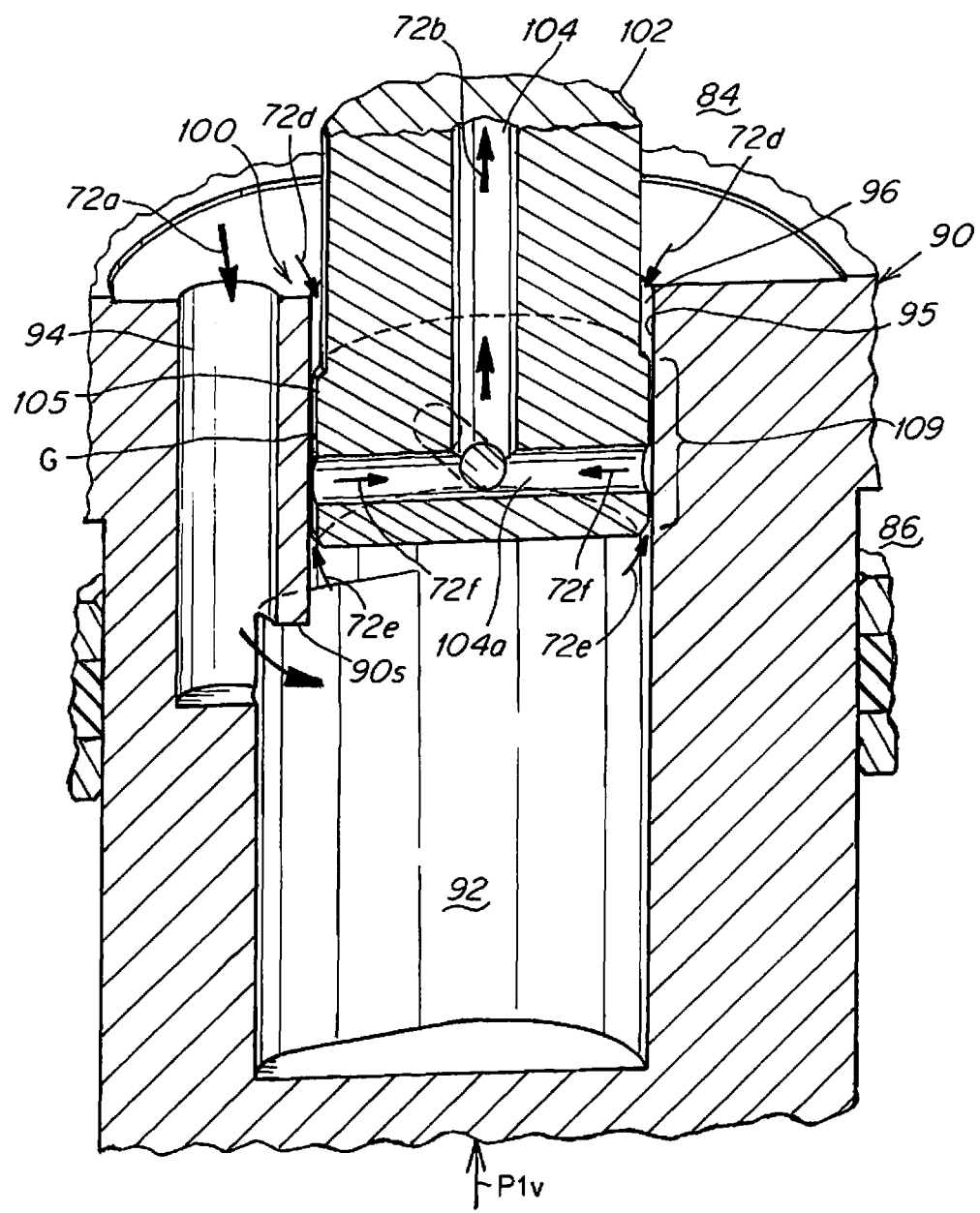
FIG. 4 is a enlarged fragmentary sectional view of the receiving aperture of the internal piston chamber showing the downstream end of the control fluid delivery tube received within the receiving aperture thus enclosing the internal piston bore and showing the path of flow of drive fluid along and through a flow restriction gap formed between the outside circumferential surface of the distal end of the control fluid delivery tube and the inside surface of the receiving aperture.

FIGS. 1-3 shows an injection molding apparatus 10 that is comprised of a hotrunner or heated 30 manifold that receives an injection fluid material 22 from an injection molding machine 20 under pressure to cause the material 22 to travel through one or more fluid distribution channels 32 downstream to and through a nozzle 60 fluid channel 62 and ultimately through a gate 54 into a mold 50 cavity 52. The apparatus 10 included an actuator 80 comprised of a housing 82 that houses and contains a piston 90 that divides a space formed within the housing 82 into an upstream drive chamber 84 and a downstream chamber 86 into which drive fluid 72 (typically oil) is controllably pumped from a source of drive fluid 70 through upstream inlet-outlet port 83 and downstream inlet-outlet port 85. The piston 90 interconnected to a valve pin 40 that is reciprocally driven axially A through a selected upstream-downstream stroke length SL. The piston 90 is slidably mounted within the housing 82 for travel over the selected stroke length SL between an upstream fully gate open position and a downstream gate closed position.

The piston 90 has an internal piston chamber 92 and a piston bore 94 that communicates flow 72a of the drive fluid 72 between one or the other of the upstream 84 or downstream 86 actuator drive chambers and the internal piston chamber 92. The actuator 90 includes a flow rate controller 100 that is comprised of a control tube 102 that has a drive fluid channel 104 that communicates flow of the drive fluid 72b between the enclosed piston chamber 92 and the source of drive fluid 70. The drive fluid controller 100 is adapted to enable flow of drive fluid 72 between one of the upstream or downstream actuator drive chambers, 84, 86 and the source of drive fluid 70 at a first low rate of flow that results in a low piston velocity P1v over a selected first portion P1 of the stroke length SL of the piston 90 and at a second high rate of flow that results in a high piston velocity P2v over a selected second portion P2 of the stroke length SL of the piston 90. In the examples shown in the FIGS. 1-9, the apparatus is configured to enable flow of fluid between the upstream actuator chamber 84 and the internal piston chamber 92.

In the examples shown, the low rate of piston velocity P1v occurs when the piston 90 is being driven upstream, FIGS. 3-6, by pumping fluid 72i into and through downstream port 85. The low rate of piston velocity P1v occurs during the period of travel when piston 90 is disposed within the initial downstream portion of the injection cycle when the piston is within the travel path P1. Such low rate of travel P1v occurs over the stroke length P1 because, when the piston is driven upstream by fluid input 72i that is pumped under pressure through downstream port 85 input into downstream chamber 86, fluid in upstream chamber 84 is then in turn also pressurized and flows 72a both through piston bore 94 into chamber 92, FIG. 3 and simultaneously flows 72d through gap G from upstream chamber 84. The fluid 72a that flows into piston chamber 92 is simultaneously driven to flow 72e through gap G. As shown in FIGS. 3-6, the fluid that is driven through gap G or into piston chamber 92 continues to flow 72f through tubular channel 104a and further continues to flow 72b through main tubular channel 104 further through upstream port 83 back into source 70.

During the upstream driven movement of the piston 90, FIGS. 3-6, the flow of drive fluid 72*b* communicates with channel 83*a* of the check valve 110. However, the push force of spring 112 of the check valve 110 is selected relative to the pressure of the fluid 72*b* during the upstream movement of the piston 90, to prevent the fluid 72*b* from pushing the plunger 114 backwards to allow the check valve aperture 116 to open. Spring 114 thus prevents upstream fluid from flowing 72*b* back into the upstream drive chamber 84 via the second check valve flow channel 84*a* by keeping aperture 116 closed during the upstream movement cycle as described with reference to FIGS. 3-6.

Gap G is formed between the outer circumferential surface 105 of the distal end of the flow control tube 102 which is adapted and configured to be received against the interior wall 95 of the complementarily shaped upstream aperture 96 of the piston chamber 92. Gap G is formed and adapted to enable a restricted rate of flow of fluid 72*d*, 72*e*, FIGS. 4, 5 that is less than the otherwise higher rate of flow 72*c*, FIG. 5 that the fluid flow when not restricted by the gap G. As shown, as the low flow rate of fluid flow 72*d*, 72*e* travels from the piston chamber 92 into and through the downstream portion 104*a* of the tube channel 104, such flow continues 72*f* upstream 72*b* towards and eventually through the upstream port 83 into the source 70 of fluid. Such restricted, low rate of flow 72*d*, 72*e*, 72*f* thus causes the piston to be driven at a first low rate of upstream travel P1*v* through a first upstream travel portion P1 of the stroke length.

Figure 5:
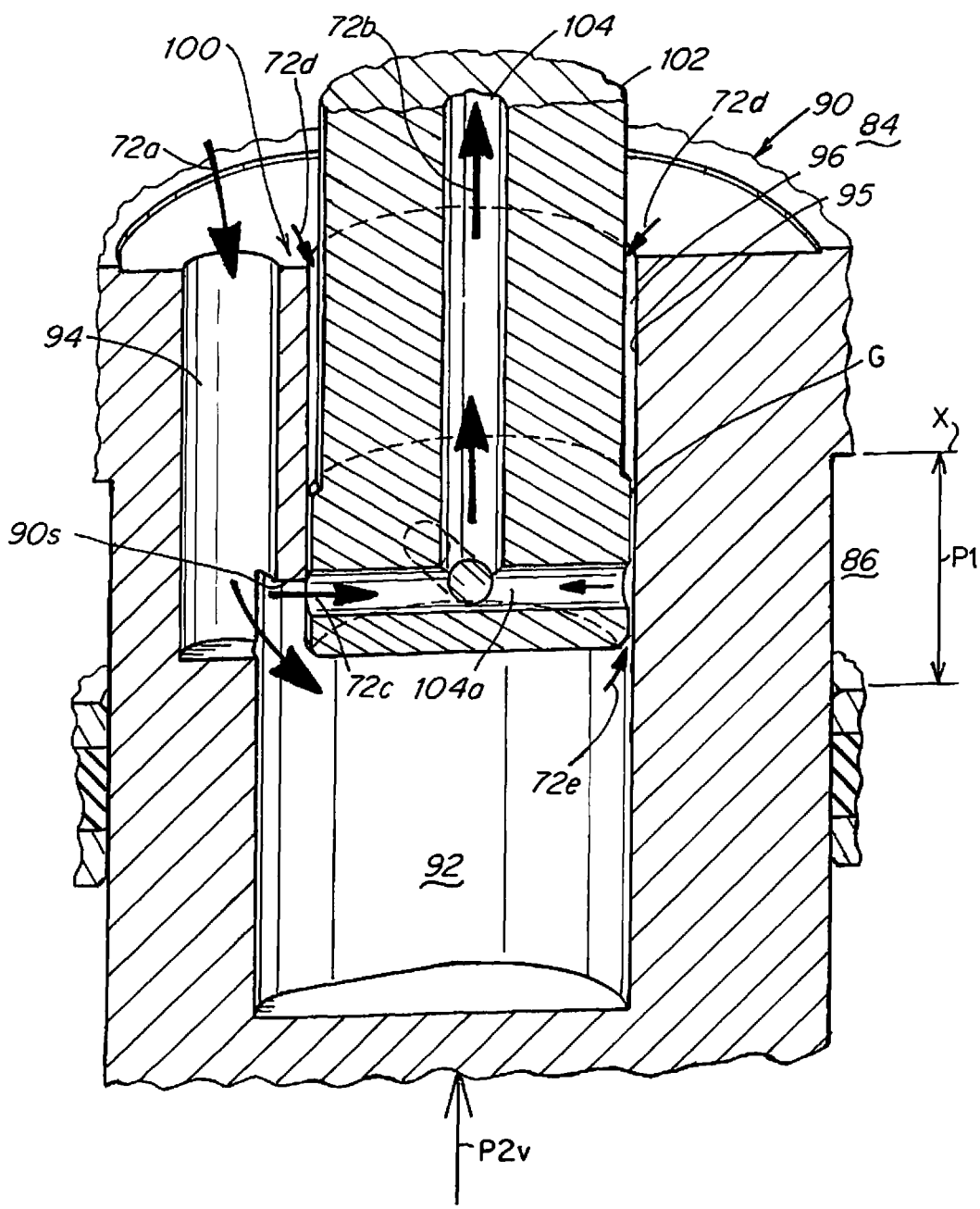
FIG. 5 is an enlarged fragmentary sectional view similar to FIG. 4 but showing the flow path of fluid without restriction from the internal piston chamber directly into the control flow tube flow channel when the piston has reached a selected intermediate upstream position along its stroke length.
Figure 6:
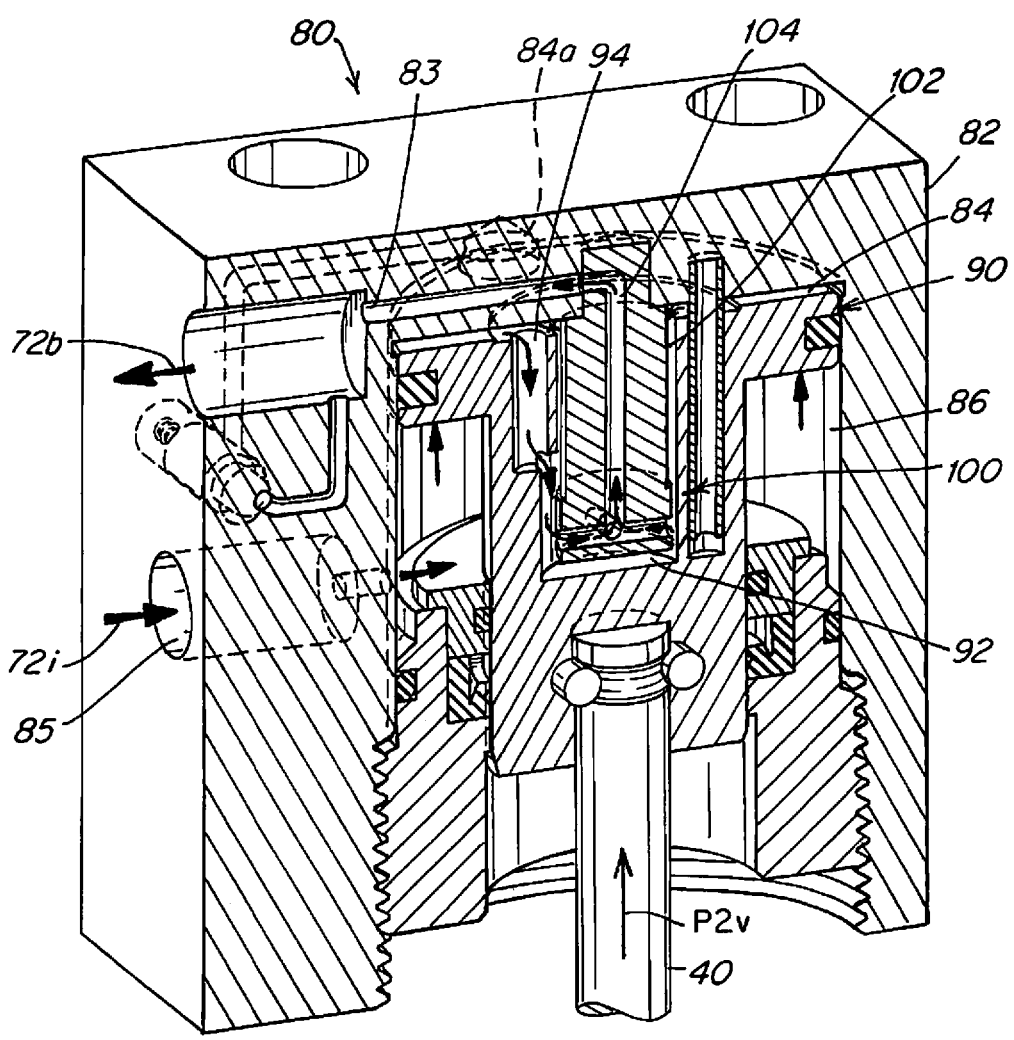
FIG. 6 is an enlarged fragmentary sectional view similar to FIG. 3 but showing the end of the unrestricted portion of upward piston travel.

During the remainder of the upstream travel along the portion P2 of the stroke length, with reference to FIG. 5, the high rate of piston travel begins when the piston 90 has travelled upstream to a position at least an upstream distance P1 such that the shoulder 90*s* of the piston chamber 92 has travelled upstream past the downstream portion 104*a* of the tube flow channel 104 thus enabling the tube channel 104*a*, 104 to communicate freely without restriction or obstruction with the interior of the piston chamber 92 such that fluid 72*c* contained within the piston chamber 92 can flow freely without obstruction or restriction 72*c*, FIG. 5, from the piston chamber 92 into and through the tube flow channel 104*a*, 104 and ultimately out of the piston 90 back to the source 70.

Thus when the piston 90 is driven upstream, FIGS. 3-6, the piston travels at two speeds or velocities.

Figure 7:
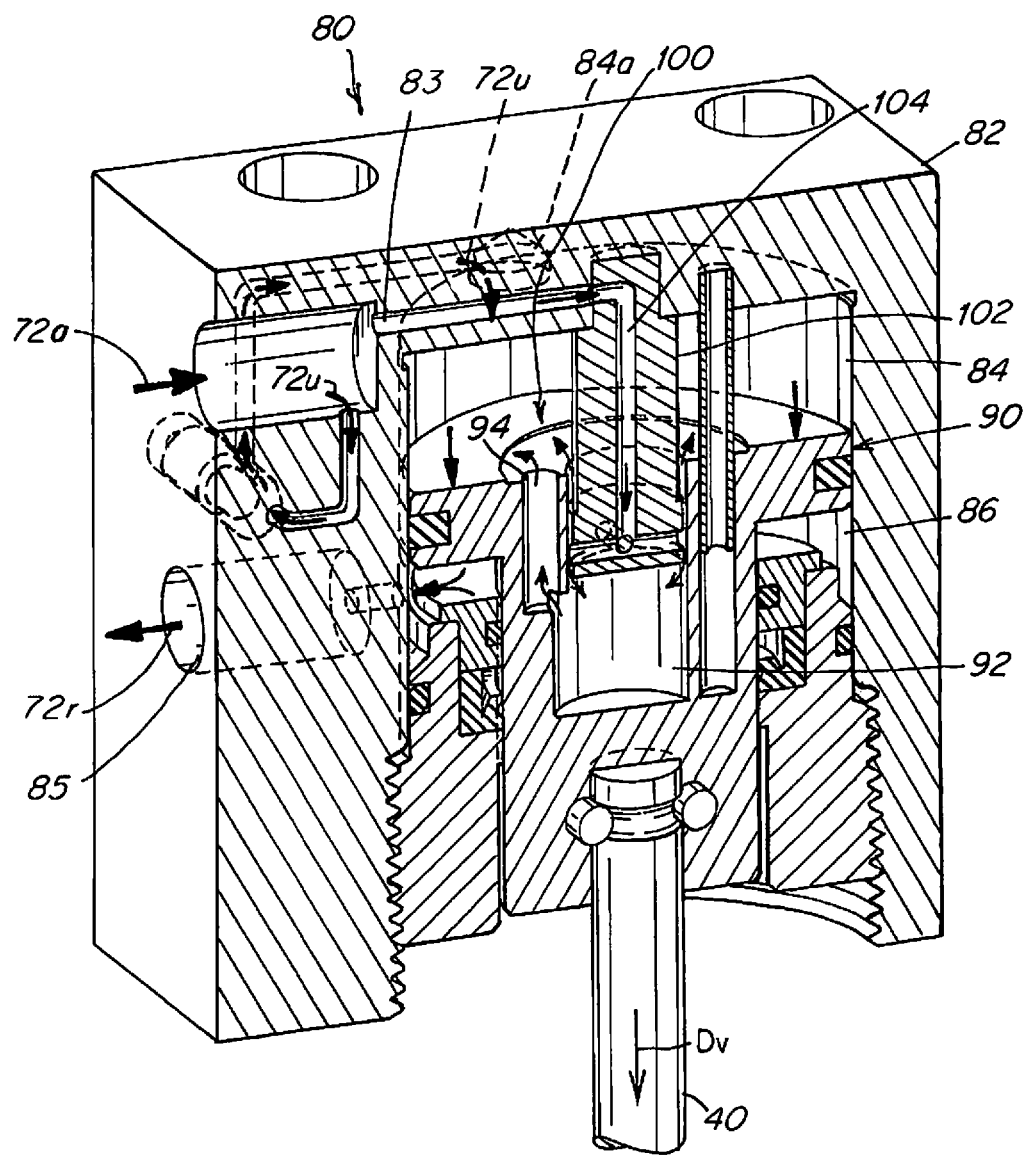
FIG. 7 is an enlarged fragmentary sectional view similar to FIG. 3 but showing flow of drive fluid through the check valve to facilitate rapid pin travel to close the gate and flow of fluid melt material during the pin closing cycle.
Figure 8:
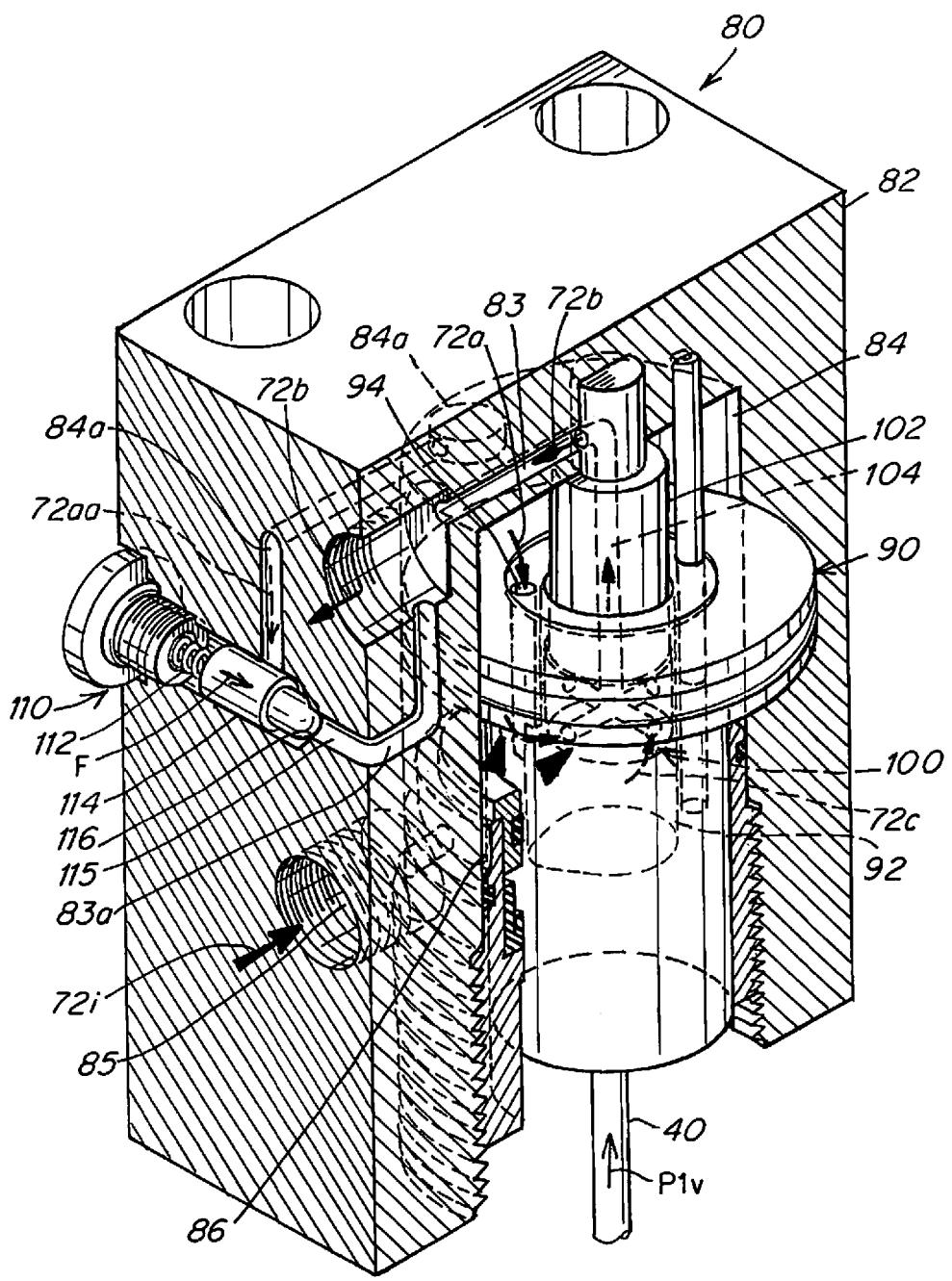
FIG. 8 an enlarged perspective sectional view of a portion of the actuator housing of the apparatus of FIG. 1 showing the location and arrangement of a check valve with its upstream port in fluid communication with the port that communicates with the source of drive fluid and its downstream port in fluid communication with the upstream actuator drive chamber. The path of flow of drive fluid shows the flow from the flow restriction gap and exiting the inlet/outlet port during the start of a pin open cycle.
Figure 9:
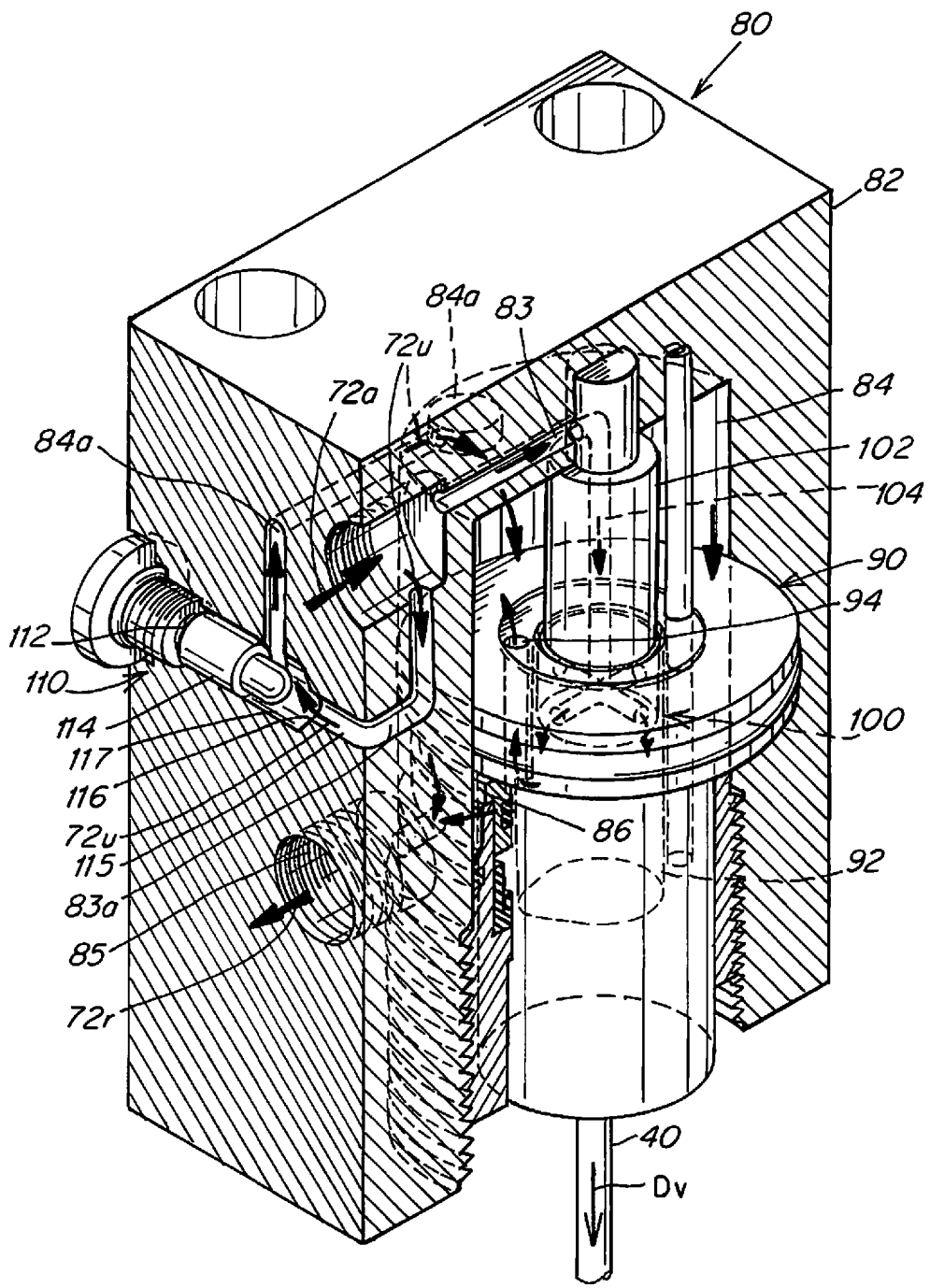
FIG. 9 is a view similar to FIG. 8 showing the path of flow of drive fluid from the source into the upstream port of the check valve when the drive fluid is first pumped into the upstream drive chamber at the beginning of the downstream travel portion of the injection cycle of the actuator of FIG. 1.

When the piston 90 is driven downstream however, as shown in FIGS. 7, 9, the piston travels at a single fast or relatively high velocity Dv on account of the use of a check valve 110, FIGS. 8, 9 that enables flow of fluid 72*u* directly from the source 70 into the upstream chamber 84 without restriction through channel or port 84*a*. The check valve 110 is adapted and configured to enable flow in one direction from input port 83 into the upstream actuator drive chamber 84 but not in the reverse direction. As shown, during the downstream drive cycle, FIGS. 7, 9, fluid is pumped 72*a* under pressure into port 83 and downstream 72*u* into contact with the upstream head of plunger 114 as shown best in FIGS. 7, 9. Spring 112 is adapted to urge the plunger into the position shown in FIG. 8 where the head of the plunger 114 closes off the valve aperture 116 under a preselected force F. During the downstream drive portion of the injection cycle, FIGS. 7, 9 the pressure of the fluid 72*u* is selected to overcome the force F and drive the plunger 114 backwards or downstream to a position where the head of the plunger 114 no longer closes off the aperture 116 thus allowing fluid 72*u* to flow downstream through the central flow channel 117, FIG. 9, of valve 110 and continuing through valve port or channel 84*a* and channels 115, 117 and continuing downstream into upstream drive chamber 84 under pressure thus driving the piston 90 downstream at one velocity Dv throughout the entire downstream cycle without the fluid 72*u* having to travel through gap G at a lower velocity. The downstream driven fluid 72*r* is forced out of drive chamber 86 and returns back to the source 70.

During the upstream drive portion of the cycle, the drive fluid 72*a* travels from chamber 84 into the check valve 110. Upstream cycle drive fluid 72*a* exerts a force in the upstream direction on plunger 114 in the same direction as spring 112 exerts force F thus maintaining aperture 116 closed and preventing fluid 72*a* from flowing at a higher velocity than is allowed 72*d*, 72*e* by gap G.

The drive fluid controller 100 that enables the two downstream speeds includes the tube 102, the piston chamber 92 and the piston bore 94. Preferably the drive fluid controller 110 is adapted to enable flow of drive fluid between the piston chamber 92 and the upstream actuator drive chamber 84.

The drive fluid controller 110 is preferably adapted to enable the first low rate of flow to occur over a selected portion P1 of the stroke length that extends from the downstream gate closed position upstream to a selected intermediate upstream position X of the piston 90.

The drive fluid controller 100 is preferably adapted to enable the high rate of flow to occur over a selected portion P2 of the stroke length extending from the selected intermediate upstream position X to the upstream fully gate open position.

The drive fluid controller 100 typically includes a restrictor or restriction gap G formed by and between the inner circumferential surface 95 of the internal piston aperture 96 and the outer circumferential surface 105 of the distal end of the tube 102. The gap G restricts flow of the drive fluid from one or the other of the upstream 84 and downstream 86 actuator drive chambers to the internal piston chamber 92 when the piston is disposed within the selected first portion P1 of the stroke length SL, the restrictor G being displaced when the piston 90 is disposed at position X and within the selected second portion P2 of the stroke length.

The drive fluid controller 110 preferably includes a control tube 102 having a control tube flow bore 104, 104*a* communicating fluid flow 72*a*, 72*c*, 72*d*, 72*e* between the source 70 of drive fluid and the piston chamber 92, a distal portion 109 of the control tube 102 having an outer circumferential surface 105 slidably received within a complementary receiving aperture 96 of the piston chamber forming a restriction gap G that restricts flow of drive fluid between the piston chamber 92 and the control tube flow bore 104*a*, 104 to the first low rate of flow and the piston velocity to the first low velocity P1*v*.

The control tube 102 and the piston bore 94 are typically adapted to enable flow of drive fluid between the piston chamber 92 and the upstream actuator drive chamber 84.

The restriction gap G and the control tube flow bore 104*a*, 104 are preferably adapted to enable the drive fluid 72*a* to flow at the first low rate of flow 72*d*, 72*e* and low rate of piston velocity P1*v* over a selected portion P1 of the stroke length SL that extends from the downstream gate closed position upstream to a selected intermediate position X.

The restriction gap G and the control tube 102 flow bore are preferably adapted to enable the drive fluid to flow at the high rate of flow 72*c* on the upstream travel portion of the cycle over a selected portion P2 of the stroke length SL extending from the intermediate position X to the upstream fully gate open position.

The control tube flow bore 104a, 104 is typically obstructed G, 72d, 72e from free drive fluid flow communication with one or the other of the actuator drive chambers 84, 86 when the piston 90 is disposed within the selected first portion P1 of the stroke length SL. The tube flow bore 104a, 104 is in free fluid flow communication with the piston chamber when the piston 90 is disposed within the selected second portion P2 of the stroke length SL.

The apparatus preferably further comprises a check valve 110 having a valve flow channel 117 having a first upstream port 83a communicating with one or the other of the upstream 83 and downstream 85 fluid source 70 communication channels and a second port or channel 84a communicating with a respective one of the upstream 84 or downstream 86 actuator drive chambers. The check valve 110 is adapted to prevent flow through the second port or channel 84a as well as check valve flow channels 115, 117 when drive fluid 72a is being driven upstream in a direction exiting the respective one of the upstream 84 or downstream 86 actuator drive chambers with which the second port 84a communicates. The check valve 110 is conversely adapted to enable flow through the valve flow channel 117 and the flow channels 84a, 115, 117 when drive fluid is being driven in a direction where fluid is entering 72u the respective one of the upstream 84 or downstream 86 actuator drive chambers with which the second port 83a communicates.

The check valve 110 typically includes a plunger 114 and a spring 112 urging F the plunger into a position closing the valve flow channel 117 under a preselected force F.

An injection molding apparatus 10 according to the invention can be comprised of: a manifold 30 that receives an injection fluid material 22 from an injection molding machine 20, the manifold 30 routing the injection fluid 22 to a fluid delivery channel 62 having a flow path that extends and delivers the injection fluid material 22 under an injection pressure to a gate 54 of a mold cavity 52. The apparatus typically includes an actuator 80 comprised of a fluid sealed housing 82 having a piston 90 interconnected to a valve pin 40, the piston 90 being slidably mounted within the housing 82 for travel over a selected stroke length SL between an upstream fully gate open position and a downstream gate closed position. The piston 90 divides the enclosed actuator housing 82 into upstream 84 and downstream 86 actuator drive chambers that are each interconnected to a source 70 of drive fluid 72 by respective upstream and downstream fluid source communication channels 83, 85. The apparatus includes a tube 102 having a drive fluid channel 104 that communicates flow of the drive fluid 72, 72a, 72b, 72c, 72d, 72e, 72f between an enclosed piston chamber 92 and the source 70 of drive fluid. The piston 90 includes a piston bore 94 that communicates flow of fluid between one of the upstream 84 or downstream 86 actuator drive chambers and the enclosed piston chamber 92. The tube 102 adapted to enable flow of drive fluid 72 between the one of the upstream 84 or downstream 86 actuator drive chambers and the source 70 of drive fluid at a first low rate of flow over a selected first portion P1 of the stroke length of the piston and at a second high rate of flow over a selected second portion P2 of the stroke length of the piston. Such an apparatus 10 can further comprise a check valve 110 having a valve flow channel 117 having a first port 83a communicating with one or the other of the upstream and downstream fluid source communication channels and a second port 84a communicating with a respective one of the upstream or downstream actuator drive chambers. The check valve 110 is adapted to prevent flow through the valve flow channel 117 when drive fluid is exiting the respective one of the upstream or downstream actuator drive chambers with which the second port communicates and to enable flow through the valve flow channel when drive fluid is entering the respective one of the upstream or downstream actuator drive chambers with which the second port communicates.

In an alternative embodiment of the invention, the apparatus 10 can remove or eliminate the use of the check valve 110 and its associated components, spring 112 and plunger 114 and channels, 84a, 115, 117 such that when drive fluid 72a is pumped into port 83 and channels 104, 104a and further downstream into upstream actuator chamber 84, the driven fluid 72a will flow at a high rate of flow (and the piston will travel at a high rate of velocity P2v) over the course of travel P2 of the piston 90 from its upstream-most position (shown in FIG. 6) to a selected intermediate downstream position X. Further, in such an alternative embodiment that does not include the check valve 110, the drive fluid 72a will flow at the low rate of flow (and the piston will travel at the low rate of velocity P1v) over the course of travel P1 of the piston 90 from the selected intermediate downstream position X, FIG. 2, to the downstream-most gate 54 closed position as shown in FIGS. 1, 2. Thus in such an alternative embodiment, the piston 90 will travel at a relatively low velocity over the course of travel through the downstream path P1 when the piston 90 is driven and is travelling in both the upstream and downstream directions.

What is claimed is:

1. An injection molding apparatus comprising:
    a manifold that receives an injection fluid material from an injection molding machine, the manifold routing the injection fluid to a fluid delivery channel having a flow path that extends and delivers the injection fluid material under an injection pressure to a gate of a mold cavity,
    an actuator comprising a fluid sealed housing having a piston interconnected to a valve pin, the piston being slidably mounted within the housing for travel over a selected stroke length between an upstream fully gate open position and a downstream gate closed position,
    wherein the piston divides the enclosed actuator housing into upstream and downstream actuator drive chambers that are each interconnected to a source of drive fluid by respective upstream and downstream fluid source communication channels,
    a tube adapted to cooperate with the piston to route flow of drive fluid between the one of the upstream or downstream actuator drive chambers and the source of drive fluid at a first low rate of flow over a selected first portion of the stroke length of the piston and at a second high rate of flow over a selected second portion of the stroke length of the piston,
    wherein the tube has an outer wall that is slidably receivable within a complementary aperture disposed within the piston to form a restriction gap that enables flow of the drive fluid from the upstream or downstream actuator drive chamber to a respective one of the upstream or downstream fluid source communication channels at the first low rate of flow over the selected portion of the stroke length.

2. The apparatus of claim 1 further comprising a check valve adapted to enable unrestricted flow of the drive fluid when driven from one of the upstream and downstream fluid source communication channels into a respective one of the upstream or downstream actuator drive chambers over the entire stroke length separately from the tube.

3. A method of mechanically driving a valve pin in an injection molding apparatus at a first low velocity and at a second higher velocity comprising interconnecting the valve pin to the piston of the apparatus of claim 1 and operating the apparatus of claim 1 to drive the piston upstream or downstream through the selected stroke length.

4. An injection molding apparatus comprising:

a manifold that receives an injection fluid material from an injection molding machine, the manifold routing the injection fluid to a fluid delivery channel having a flow path that extends and delivers the injection fluid material under an injection pressure to a gate of a mold cavity, an actuator comprising a fluid sealed housing having a piston interconnected to a valve pin, the piston being slidably mounted within the housing for travel over a selected stroke length between an upstream fully gate open position and a downstream gate closed position, wherein the piston divides the enclosed actuator housing into upstream and downstream actuator drive chambers that are each interconnected to a source of drive fluid by respective upstream and downstream fluid source communication channels, the piston having an internal piston chamber and a piston bore that communicates flow of the drive fluid between one of the upstream or downstream actuator drive chambers and the internal piston chamber, the actuator including a drive fluid controller comprised of a drive fluid channel that communicates flow of the drive fluid between the enclosed piston chamber and the source of drive fluid, the drive fluid controller being adapted to enable flow of drive fluid between one of the upstream or downstream actuator drive chambers and the source of drive fluid at a first low rate of flow over a selected first portion of the stroke length of the piston and at a second high rate of flow over a selected second portion of the stroke length of the piston, wherein the drive fluid controller comprises a control tube having a control tube flow bore communicating fluid flow between the source of drive fluid and the piston chamber, a distal portion of the control tube having an outer circumferential surface slidably received within a complementary receiving aperture of the piston chamber forming a restriction gap that restricts flow of drive fluid between the piston chamber and the control tube flow bore to the first low rate of flow when the piston is disposed within the selected first portion of the stroke length.

5. The apparatus of claim 4 wherein the drive fluid controller is adapted to enable flow of drive fluid between the piston chamber and the upstream actuator drive chamber.

6. The apparatus of claim 4 wherein the drive fluid controller is adapted to enable the first low rate of flow to occur over a selected portion of the stroke length that extends from the downstream gate closed position upstream to a selected intermediate upstream position.

7. The apparatus of claim 6 wherein the drive fluid controller is adapted to enable the high rate of flow to occur over a selected portion of the stroke length extending from the selected intermediate upstream position to the upstream fully gate open position.

8. The apparatus of claim 4 wherein the drive fluid controller includes a restrictor that restricts flow of the drive fluid from the one upstream or downstream actuator drive chamber to the piston chamber when the piston is disposed within the selected first portion of the stroke length, the restrictor being displaced when the piston is disposed within the selected second portion of the stroke length.

9. The apparatus of claim 4 wherein the control tube and the piston bore are adapted to enable unrestricted flow of drive fluid between the piston chamber and the upstream actuator drive chamber when the piston is disposed within the selected second portion of the stroke length.

10. The apparatus of claim 4 wherein the restriction gap and the control tube flow bore are adapted to enable the drive fluid to flow at the first low rate of flow over a selected portion of the stroke length that extends from the downstream gate closed position upstream to a selected intermediate upstream position.

11. The apparatus of claim 10 wherein the restriction gap and the control tube flow bore are adapted to enable the drive fluid to flow at the high rate of flow over a selected portion of the stroke length extending from the intermediate upstream position to the upstream fully gate open position.

12. The apparatus of claim 4 wherein the control tube flow bore is obstructed from free fluid flow communication with the one actuator drive chamber when the piston is disposed within the selected first portion of the stroke length and wherein the tube flow bore is in free fluid flow communication with the piston chamber when the piston is disposed within the selected second portion of the stroke length.

13. The apparatus of claim 4 further comprising a check valve having a valve flow channel having a first port communicating with one or the other of the upstream and downstream fluid source communication channels and a second port communicating with a respective one of the upstream or downstream actuator drive chambers separately from the drive fluid controller, the check valve being adapted to prevent flow through the second port when drive fluid is exiting or driven out of the respective one of the upstream or downstream actuator drive chambers with which the second port communicates and to enable flow through the second port when drive fluid is entering or driven into the respective one of the upstream or downstream actuator drive chambers with which the second port communicates.

14. The apparatus of claim 13 wherein the check valve includes a plunger and a spring urging the plunger into a position closing the valve flow channel under a preselected force.

15. The apparatus of claim 4 further comprising a check valve having a valve flow channel having a first port communicating with the upstream fluid source communication channel and a second port communicating with the upstream actuator drive chamber separately from the drive flow controller, the check valve being adapted to prevent flow through the second port when the piston is driven upstream.

16. The apparatus of claim 4 further comprising a check valve adapted to enable unrestricted flow of the drive fluid when driven from one of the upstream and downstream fluid source communication channels into a respective one of the upstream or downstream actuator drive chambers over the entire stroke length separately from the drive fluid controller.

17. A method of mechanically driving a valve pin in an injection molding apparatus at a first low velocity and at a second higher velocity comprising interconnecting the valve pin to the piston of the apparatus of claim 4 and operating the apparatus of claim 4 to drive the piston upstream or downstream through the selected stroke length.

18. A method of mechanically driving a valve pin in an injection molding apparatus at a first low velocity and at a second higher velocity wherein the injection molding apparatus comprises:

a manifold that receives an injection fluid material from an injection molding machine, the manifold routing the injection fluid to a fluid delivery channel having a flow path that extends and delivers the injection fluid material under an injection pressure to a gate of a mold cavity, an actuator comprising a fluid sealed housing having a piston interconnected to a valve pin, the piston being slidably mounted within the housing for travel over a selected stroke length between an upstream fully gate open position and a downstream gate closed position, wherein the piston divides the enclosed actuator housing into upstream and downstream actuator drive chambers that are each interconnected to a source of drive fluid by respective upstream and downstream fluid source communication channels, the piston having an internal piston chamber and a piston bore that communicates flow of the drive fluid between one of the upstream or downstream actuator drive chambers and the internal piston chamber, the actuator including a drive fluid controller comprised of a drive fluid channel that communicates flow of the drive fluid between the enclosed piston chamber and the source of drive fluid, the drive fluid controller being adapted to enable flow of drive fluid between one of the upstream or downstream actuator drive chambers and the source of drive fluid at a first low rate of flow over a selected first portion of the stroke length of the piston and at a second high rate of flow over a selected second portion of the stroke length of the piston, wherein the apparatus includes a tube that has an outer wall that is slidably receivable within a complementary aperture disposed within the piston to form a restriction gap that enables flow of the drive fluid from the upstream or downstream actuator drive chamber to a respective one of the upstream or downstream fluid source communication channels at the first low rate of flow over the selected portion of the stroke length the method comprising:
feeding the drive fluid into the one of the upstream or downstream actuator drive chambers at an elevated pressure sufficient to drive the piston along the stroke length.

19. The method of claim 18 wherein the piston bore communicates flow of the drive fluid between the upstream actuator drive chamber and the internal piston chamber, the drive fluid controller is adapted to enable flow of drive fluid between the upstream actuator drive chamber and the source of drive fluid, and the apparatus includes a check valve having a valve flow channel having a first port communicating with the upstream fluid source communication channel and a second port communicating with the upstream actuator drive chamber separately from the drive fluid controller, the check valve being adapted to prevent flow through the second port when the piston is driven upstream, the method further comprising:
driving the piston downstream by feeding the drive fluid into the upstream actuator drive chamber at an elevated pressure sufficient to drive the piston along the stroke length.

20. An injection molding apparatus comprising:
a manifold that receives an injection fluid material from an injection molding machine, the manifold routing the injection fluid to a fluid delivery channel having a flow path that extends and delivers the injection fluid material under an injection pressure to a gate of a mold cavity, an actuator comprising a fluid sealed housing having a piston interconnected to a valve pin, the piston being slidably mounted within the housing for travel over a selected stroke length between an upstream fully gate open position and a downstream gate closed position, wherein the piston divides the enclosed actuator housing into upstream and downstream actuator drive chambers that are each interconnected to a source of drive fluid by respective upstream and downstream fluid source communication channels, a tube having a drive fluid channel that communicates flow of the drive fluid between an enclosed piston chamber and the source of drive fluid, the piston including a piston bore that communicates flow of fluid between the one of the upstream or downstream actuator drive chambers and the enclosed piston chamber, the tube being adapted to enable flow of drive fluid between the one of the upstream or downstream actuator drive chambers and the source of drive fluid at a first low rate of flow over a selected first portion of the stroke length of the piston and at a second high rate of flow over a selected second portion of the stroke length of the piston, wherein the tube has an outer wall that is slidably receivable within a complementary aperture disposed within the piston to form a restriction gap that enables flow of the drive fluid from the upstream or downstream actuator drive chamber to a respective one of the upstream or downstream fluid source communication channels at the first low rate of flow over the selected portion of the stroke length.

21. The apparatus of claim 20 further comprising a check valve having a valve flow channel having a first port communicating with one or the other of the upstream and downstream fluid source communication channels and a second port communicating with a respective one of the upstream or downstream actuator drive chambers separately from the drive fluid controller, the check valve being adapted to prevent flow through the second port when drive fluid is exiting or driven into the respective one of the upstream or downstream actuator drive chambers with which the second port communicates and to enable flow through the second port when drive fluid is entering or driven into the respective one of the upstream or downstream actuator drive chambers with which the second port communicates.

22. A method of mechanically driving a valve pin in an injection molding apparatus at a first low velocity and at a second higher velocity wherein the injection molding apparatus comprises:
a manifold that receives an injection fluid material from an injection molding machine, the manifold routing the injection fluid to a fluid delivery channel having a flow path that extends and delivers the injection fluid material under an injection pressure to a gate of a mold cavity, an actuator comprising a fluid sealed housing having a piston interconnected to a valve pin, the piston being slidably mounted within the housing for travel over a selected stroke length between an upstream fully gate open position and a downstream gate closed position, wherein the piston divides the enclosed actuator housing into upstream and downstream actuator drive chambers that are each interconnected to a source of drive fluid by respective upstream and downstream fluid source communication channels, a tube having a drive fluid channel that communicates flow of the drive fluid between an enclosed piston chamber and the source of drive fluid, the piston including a piston bore that communicates flow of fluid between the one of the upstream or downstream actuator drive chambers and the enclosed piston chamber, the tube being adapted to enable flow of drive fluid between the one of the upstream or downstream actuator drive chambers and the source of drive fluid at a first low rate of flow over a selected first portion of the stroke length of the piston and at a second high rate of flow over a selected second portion of the stroke length of the piston, wherein the tube has an outer wall that is slidably receivable within a complementary aperture disposed within the piston to form a restriction gap that enables flow of the drive fluid from the upstream or downstream actuator drive chamber to a respective one of the upstream or downstream fluid source communication channels at the first low rate of flow over the selected portion of the stroke length the method comprising:

feeding the drive fluid into the one of the upstream or downstream actuator drive chambers at an elevated pressure sufficient to drive the piston along the selected stroke length.

23. A method of mechanically driving a valve pin in an injection molding apparatus at a first low velocity and at a second higher velocity comprising interconnecting the valve pin to the piston of the apparatus of claim 20 and operating the apparatus of claim 20 to drive the piston upstream or downstream through the selected stroke length.

24. An injection molding apparatus comprising:

a manifold that receives an injection fluid material from an injection molding machine, the manifold routing the injection fluid to a fluid delivery channel having a flow path that extends and delivers the injection fluid material under an injection pressure to a gate of a mold cavity, an actuator comprising a fluid sealed housing having a piston interconnected to a valve pin, the piston being slidably mounted within the housing for travel over a selected stroke length between an upstream fully gate open position and a downstream gate closed position, wherein the piston divides the enclosed actuator housing into upstream and downstream actuator drive chambers that are each interconnected to a source of drive fluid by respective upstream and downstream fluid source communication channels, the actuator including one or more internal channels, that communicate drive fluid between one or the other of the upstream and downstream actuator drive chambers, the one or more internal channels being adapted to communicate drive fluid between the upstream or downstream drive chamber and the source of fluid such that the piston is driven at a first low velocity of travel over the course of travel of a first portion of the stroke length and such that the piston is driven at a second high velocity of travel over the course of travel of a second portion of the stroke length, wherein the apparatus includes a tube that has an outer wall that is slidably receivable within a complementary aperture disposed within the piston to form a restriction gap that enables flow of the drive fluid from the upstream or downstream actuator drive chamber to a respective one of the upstream or downstream fluid source communication channels at the first low rate of flow over the selected portion of the stroke length.

25. A method of mechanically driving a valve pin in an injection molding apparatus at a first low velocity and at a second higher velocity comprising interconnecting the valve pin to the piston of the apparatus of claim 24 and operating the apparatus of claim 24 to drive the piston upstream or downstream through the selected stroke length.

* * * * *